F. HOFFMAN.
GATE OPERATING AND LOCKING MEANS.
APPLICATION FILED AUG. 30, 1913.
1,129,867.
Patented Mar. 2, 1915.
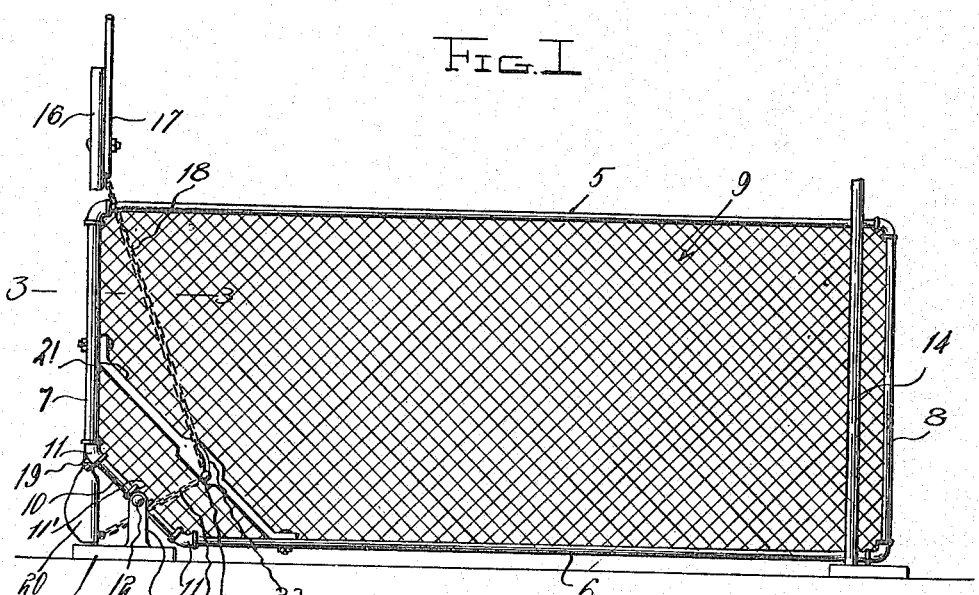
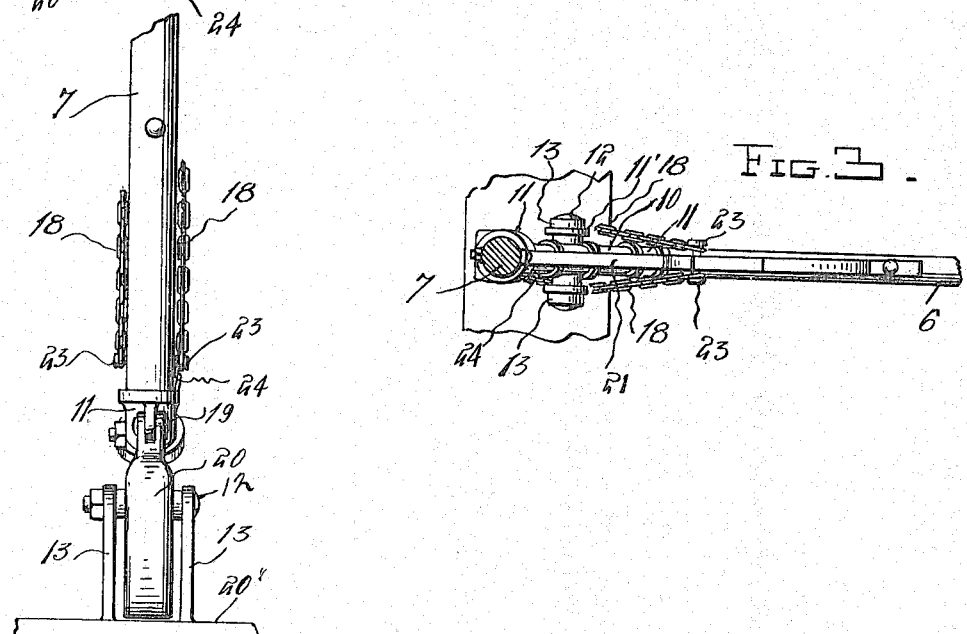

UNITED STATES PATENT OFFICE.

FLORETTE HOFFMAN, OF HOUSTON, TEXAS.

GATE OPERATING AND LOCKING MEANS.

1,129,867.          Specification of Letters Patent.      Patented Mar. 2, 1915.

Application filed August 30, 1913. Serial No. 787,469.

*To all whom it may concern:*

Be it known that I, FLORETTE HOFFMAN, a citizen of the United States, residing at Houston, in the county of Harris, State of Texas, have invented certain new and useful Improvements in Gate Operating and Locking Means; and I do hereby declare the following to be a full, clear, and exact description of the invention, such as will enable others skilled in the art to which it appertains to make and use the same.

This invention relates to new and useful improvements in gates and particularly that class which swing in a vertical plane.

The present invention is an improvement over patent A. B. Pickett No. 923,884 issued June 8, 1909. The gate disclosed in this patent, and other gates of the same general structure present a serious disadvantage in that hogs or other animals are enabled to pass through the gate by rooting thereunder and lifting the same.

The object of the present invention therefore resides specifically in means for automatically locking a gate of the class described in closed position and the invention further contemplates the provision of such automatic locking means which are released by actuating the means provided for swinging the gate to open position.

A further object of the invention is to provide such a distribution of weight in a gate of this character as conduces to a maximum ease of operation.

With the foregoing and other objects in view the invention resides in the novel combination, formation and arrangement of parts to be more fully hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a side elevational view of the improved gate, Fig. 2 is an end elevation of the locking means, Fig. 3 is a sectional view on the line 3—3 of Fig. 1.

Referring now more particularly to the drawings, wherein is shown the preferred embodiment of the invention, 5 designates the top bar, 6 the bottom, 7 the pivoted end and 8 the free end bar of the gate disclosed in the afore-mentioned patent, a foraminous body member 9 being secured to these bars. The bars are preferably formed of pipe sections. A short diagonal bar 10 has its ends secured to the adjacent end of the end bar 7 and bottom bar 6 by the elbows 11. The diagonal bar comprises two sections secured together by the four-way connection 11', a pivot shaft 12 being passed through two arms of the connection and supported by the uprights 13. Disposed on each side of the free end of the gate is the usual guide upright 14 and disposed adjacent the pivoted end of the gate are the posts 16 carrying the levers 17 to which are secured the chains 18 engaging the gate to move the same.

The means for locking the gate against all undesired movement also serves as a weight to distribute the weight of the gate and thus promote ease of operation. To accomplish this the uppermost elbow 11 is provided with a lug 19 and an oblong block 20 is pivotally secured thereto and adapted to rest over and adjacent a suitable support 20' on the ground when the gate is closed. The bottom face of the block 20 is flat and the face of the block adjacent the bar 10 is also flat, the outer face of the block being curved.

To swing the block 20 to inoperative position in the same movement that lifts the gate open, a bar 21 is secured to the bars 6 and 7 inwardly of the bar 10 and is provided with an arcuate slot 22 in its central portion. A pin 23 is slidable in this slot and has secured thereto the chains 18 carried by the levers 17. To this pin is also attached a connection 24 secured to the block 20. Therefore, when the link is moved to lift the gate it will first cause the pin to ride in the slot and thus move the weight to unlocking position. When this is done the pin engages the end of the slot and the gate is lifted.

From the foregoing it is observed that a comparatively simple and a highly efficient and durable structure has been provided which will efficiently perform the functions required thereof.

What is claimed is:

The combination with a gate pivoted adjacent one end to swing in a vertical plane, of a locking block pivotally suspended from said end, a diagonal bar disposed adjacent said end portion of the gate, and provided with a longitudinal slot, a pivoted lever, a pin slidably passed through the said slot, a chain connection between the lever and the
5 pin and a chain connection between the block and the pin.

In testimony whereof, I affix my signature, in the presence of two witnesses.

FLORETTE HOFFMAN.

Witnesses:
  HELEN CRANE,
  MAURICE EDLER.

Copies of this patent may be obtained for five cents each, by addressing the "Commissioner of Patents, Washington, D. C."